July 20, 1926.

T. A. WRY

MOLDING PROCESS AND APPARATUS

Filed Sept. 25, 1924

1,593,370

Inventor,
Thomas A. Wry.
by *Alexander D. Lunt*
His Attorney

Patented July 20, 1926.

1,593,376

UNITED STATES PATENT OFFICE.

THOMAS A. WRY, OF LYNN, MASSACHUSETTS, ASSIGNOR TO GENERAL ELECTRIC COMPANY, A CORPORATION OF NEW YORK.

MOLDING PROCESS AND APPARATUS.

Application filed September 25, 1924. Serial No. 739,894.

The present invention relates to the manufacture of objects, such for example as electrical insulators, by the compaction under pressure of compositions having adhesive property as for example mixtures of asbestos, ground mineral or other filler material and a binder of asphaltic or gummy character.

Heretofore, materials of this kind have been molded by high pressure applied by a hydraulic press or similar device. Such a device which applies the molding pressure by a single stroke requires an exceedingly high pressure for proper operation and does not as completely remove trapped air, as is desirable.

In accordance with my invention, these compositions are molded by a succession of blows. By using a succession of blows, a lower molding pressure and lighter apparatus can be used with the production of a product which has a greater strength and is more homogeneous in composition than a product made by the application of a single slow pressure application.

Figure 1:
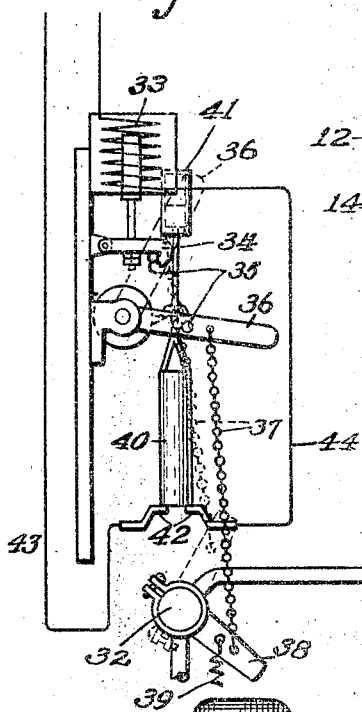
Figure 3:
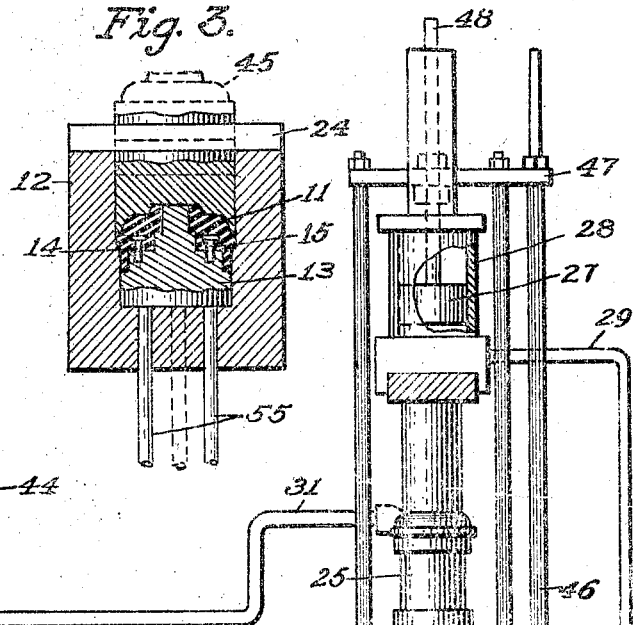
Figure 2:
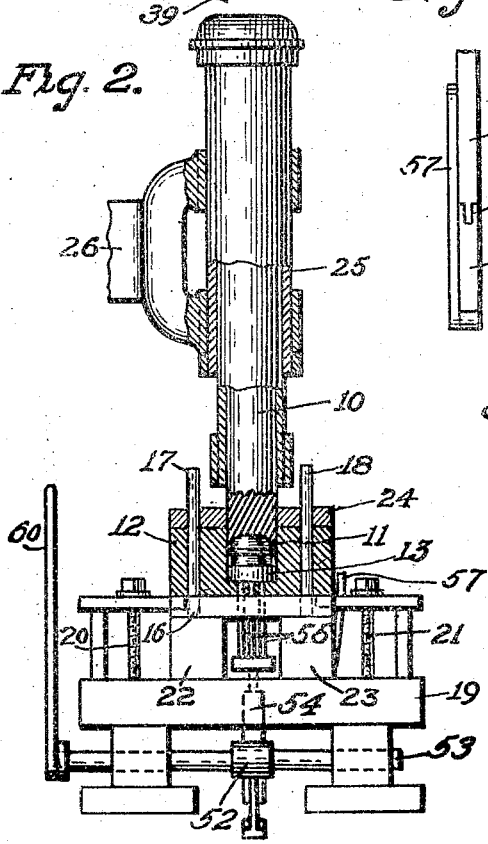
Figure 4:
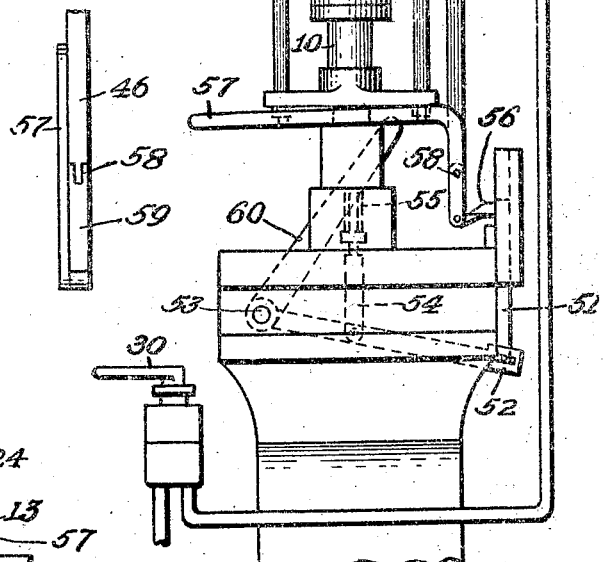

My invention also comprises an apparatus for automatically carrying out this process and includes means for timing the number of blows to which the molding composition is subjected and also means for ejecting the work. These and other features of my invention will be described in detail in connection with the accompanying drawing in which Fig. 1 is a side elevation, partly in section, of a machine adapted to carry out the molding process constituting my invention; Fig. 2 is a front elevation, partly in section, of the molding members; and Figs. 3 and 4 illustrate details of the apparatus.

The apparatus shown in Fig. 1 comprises a molding device for delivering blows to the work, a timing device whereby the number of molding blows is determined without requiring any attention on the part of the operator, and an automatic device for discharging the finished product. As shown in Figs. 1 and 2, the molding apparatus comprises a pneumatically operated hammer 10 having a die 11 in its lower end which compacts the molding composition held within a die housing 12 which is shown in detail in Fig. 3. To secure maximum speed the quantity of charge is measured in a container, not shown, before placing it in the die, but this is a detail which may be varied at the will of the operator. When the article to be molded consists of an attachment plug, as shown in Fig. 3, two small brass eyelets 14 and 15 are placed on the die member 13 to be incorporated into the molded article.

The die housing is secured to a plate 16 by the rods 17, 18 and the plate 16 in turn is secured to a bed plate 19 by the bolts 20, 21. Space blocks, 22, 23 are interposed between the plate 16 and the bed plate 19. The guide plate 24, which is attached to the hammer 10, slides upon the rods 17, 18 which serve to guide the movements of the hammer. The hammer 10 moves within a stationary casing 25 which is secured by an arm 26 to the main support of the machine which is shown as being broken away at the arm 26. The hammer 10 can be raised away from the work by a piston 27 (Fig. 1) which has a reciprocating movement in the cylinder 28 and is operated by compressed air, supplied through a pipe 29 and controlled by a hand operated valve 30. The piston 27 and the hammer connected to it have a range of motion of about 4" so as to permit a charge to be placed in the mold and the finished work to be removed. The details of construction of the pneumatic hammer have not been shown as they are of standard construction. The compressed air for operating the hammer is received by a pipe 31 which is controlled by a valve 32 by an automatic electrically operated mechanism. This mechanism comprises an electromagnet 33, the solenoid of which is connected to a latch 34. This latch engages with a pin 35 upon a lever 36, which in turn is connected by chain 37 to a valve lever 38. When this lever 38 is pulled downwardly by the spring 39, the supply of compressed air is cut off, thus interrupting the molding operation.

At the beginning of the operation, the lever 36 is set in a nearly upright position as shown by dotted lines, latching the pin 35. Assuming that a charge has been placed in the mold and that the hammer 10 has been lowered upon the work by the piston 27, the molding operation is begun by the admission of compressed air to the hammer and a succession of blows are delivered to the work at about a ton pressure per square inch each, when using about 90 pounds air pressure.

During the delivery of these blows, the weight 40 in the timing device which is connected to the lever 36, descends, the rate of descent being governed by the adjustment of a dash pot 41. The weight 40 finally bridges contacts 42 in the circuit 43, 44 of the electromagnet and causes the magnet to be energized. The magnet pulls up its armature and unlatches the pin 35, allowing the spring 39 to pull down the valve lever 38 and interrupting the molding operation. With the above pressure, a molded product which is strong and homogeneous will be produced in about 3½ seconds, during which time the hammer delivers about 45 blows.

The finished product is ejected as indicated by dotted lines 45 in Fig. 3 by a mechanism which is operated by the upward thrust of the piston 27 when the hammer is lifted away from the work. As shown in Fig. 1, the ejecting or stripping mechanism is connected to the piston 27 by a rod 46 attached at its upper end to a cross-bar 47, which in turn is connected to the piston rod 48. The cross-bar 47 is connected to the hammer 10 by vertical rods 49, 50. When the piston and hammer mechanism are raised away from the work, the rod 46 pulls with it in upward direction a rod 51 which is connected to a lever 52 and is pivoted at 53. This lever 52 is connected to the die member 13 by a link 54 and pins 55, two of which are shown in full lines in Fig. 3. By this upward movement of the link 54, the completed molded part is stripped or ejected out of the mold and placed as indicated by dotted lines at 45 in an accessible position from which it may be removed by the operator.

The rod 46 connects with the rod 51 by a latch 56 which is automatically locked, ready to begin a stripping operation when the hammer is lowered upon the work, preliminary to molding. If desired, the latch 56 may be manually disengaged by a hand lever 57 which is fulcrumed at 58 to a short link 59 which carries one of the latching members. When the hand lever 57 is moved upwardly, the latch is released. If, for any reason the automatic stripping mechanism becomes inoperative, then the work may be ejected by a hand operated lever 60 which is fulcrumed on a shaft 53. By moving the hand lever 60 to the left, in the position shown in Fig. 1, the ejecting mechanism is forced upwardly, stripping the work from the mold.

What I claim as new and desire to secure by Letters Patent of the United States, is:

1. The method of molding a compressible material between relatively movable die members which consists in subjecting said material between members to approximately 13 blows per second at a pressure of about one ton per square inch each.

2. The method of compacting a moldable composition which consists in subjecting a predetermined amount of said composition to approximately 13 blows per second between die members at a pressure sufficiently high to produce a dense, strong product.

3. A molding apparatus comprising relatively movable mold members, means for holding a molding composition between said members, power means for automatically moving one of said members into and out of molding relation with the other member to exert a succession of blows upon said composition, and means operable independently of said power means for automatically interrupting the operation of said one member at the end of a predetermined period of time.

4. A molding apparatus comprising cooperating mold members, means for moving said members in and out of molding relation repeatedly at a rate adapted to exert blows upon a molding charge therebetween, means for interrupting said operation after the elapse of a predetermined interval, means for separating said mold members for a distance which is materially greater than said molding strokes and means operative by said separating means for ejecting the molded work from one of said mold members.

5. A molding apparatus comprising relatively movable mold members, pneumatic means for moving said members into and out of molding relation repeatedly to thereby deliver in a predetermined period of time a succession of blows upon the material to be molded, and means for automatically interrupting the operation of said pneumatic means at the end of said predetermined period of time.

6. A molding apparatus comprising relatively movable die members, pneumatically operated means for moving said members in and out of molding relation, electro-magnetic means for interrupting the feed of said air, and a timing switch for operating said means.

7. A molding apparatus comprising relatively movable die members, a pneumatically operated hammer carrying one of said members into molding relation with the other member, means for timing the operation of said hammer, independently operated means for moving said hammer away from the work and means operated thereby for ejecting the completed work from one of said die members.

8. In combination, a molding apparatus comprising relatively movable die members, means for moving said members into and out of molding relation, an electrical device for controlling said means, and a time switch for controlling said electrical device.

In witness whereof, I have hereunto set my hand this 23rd day of September, 1924.

THOMAS A. WRY.